United States Patent [19]

Bergquist

[11] Patent Number: 4,680,887
[45] Date of Patent: Jul. 21, 1987

[54] SUPPORT STAND FOR A MINNOW TRAP

[76] Inventor: Thomas O. Bergquist, P.O. Box 121, Ceredo, W. Va. 22507

[21] Appl. No.: 843,676

[22] Filed: Mar. 25, 1986

[51] Int. Cl.$^4$ .............................................. A01K 69/00
[52] U.S. Cl. ....................................... 43/100; 43/103; 211/74
[58] Field of Search .................. 43/100, 103; 248/312, 248/312.1; 222/173, 186; 211/74

[56] References Cited

U.S. PATENT DOCUMENTS

| D. 46,993 | 2/1915 | Betz | 43/100 |
|---|---|---|---|
| 523,068 | 7/1894 | Gaul | 211/74 |
| 665,776 | 1/1901 | Fletcher | 211/74 |
| 779,271 | 1/1905 | Faries | 222/173 |
| 1,270,095 | 6/1918 | Baehr | 211/74 |
| 2,264,215 | 11/1941 | McClish | 222/186 |
| 2,522,017 | 9/1950 | Bergman | 43/100 |
| 2,898,648 | 8/1959 | Bair | 43/100 |
| 3,746,178 | 7/1973 | Wagschal | 211/74 |

FOREIGN PATENT DOCUMENTS 1077158  7/1967  United Kingdom ................. 43/100

Primary Examiner—Nicholas P. Godici
Assistant Examiner—Karen Skillman
Attorney, Agent, or Firm—Larson and Taylor

[57] ABSTRACT

A support stand for a minnow trap of the type comprising a large jar having a funnel opening at one end and a plurality of apertures at the other end. The ends of the jar are engaged and supported by a pair of opposed generally planar end plates. A plurality of generally parallel support rods extend between these end plates and are spaced apart circumferentially so as to secure the jar against transverse movement between the rods. A handle means is pivotally connected to one of these support rods.

4 Claims, 3 Drawing Figures

SUPPORT STAND FOR A MINNOW TRAP

BACKGROUND OF THE INVENTION

This invention relates to a support stand for a minnow trap as used for example by fisherman for catching live bait. More particularly, the invention relates to a new improved support stand for a minnow trap which is lightweight, durable and more convenient to use.

Minnow traps are known which comprise a jar having a funnel opening at one end, apertures at the opposite end, and wherein the jar is arranged, in use, at the bottom of a stream with the funnel opening facing downstream. Examples of such minnow traps are shown in U.S. Pat. Nos. 2,055,912; 2,465,812; 2,569,833; Pat. Nos. De. 46,993 and 270,266. An arrangement with a funnel at both ends is shown in U.S. Pat. No. 2,755,594.

Generally, minnow traps of this type are placed with the large funnel opening facing downstream. Bait is placed inside the bottle and carried out of the large opening by the current, and this serves to attract the minnows.

However, heretofore, a suitable means has not been provided for handling of these minnow traps and properly placing these minnow traps in a stream. For example, some of these minnow traps as shown in U.S. Pat. Nos. 2,055,912 and 2,465,812 simply lay on the bottom of the stream, without a suitable, convenient handling and supporting stand, although they are provided with a handle or the like for at least positioning the minnow trap on the stream bed. U.S. Pat. No. De. 46,993 shows a support and handling means. However, this particular means which comprises a pair of bands, a fixed handle and a number of legs is less safe to use. Because of the engagement of the bands with the glass jar, it is generally made of metal and hence neither lightweight nor rustproof and the individual legs do not provide full stability for the minnow trap in a stream.

Thus, there is a need for a new and improved support stand for a minnow trap of the type described.

SUMMARY OF THE INVENTION

Hence, it is an object of the present invention to provide a new and improved support stand for a conventional minnow trap. More specifically, it is a purpose of the present invention to provide a new and improved support stand for a conventional jar-type minnow trap which is lightweight, durable, has stability and is convenient to use.

This object of the present invention is achieved by providing a support stand for a minnow trap, particularly suited for a conventional jar-type minnow trap of the type having a large opening at the downstream end and small apertures at the opposite end, wherein the stand provides support for the jar in the form of generally flat plates placed against opposite ends of the jar with a plurality of rods interconnecting these plates.

There must be at least three rods, so as to sufficiently secure the lateral surfaces of the jar. Preferably a lightweight handle, also formed as a rod, is pivotally connected to one of the rods which is located at the top of the support stand.

These and other objects of the present invention will become apparent from the detailed description to follow, which is to be read together with the accompanying drawings.

BRIEF DESCRIPTION OF THE DRAWINGS

There follows a detailed description of a perferred embodiment of the present invention which is to be read together with the accompanying drawings wherein.

DETAILED DESCRIPTION OF THE PREFERRED EMBODIMENTS

Figure 1:
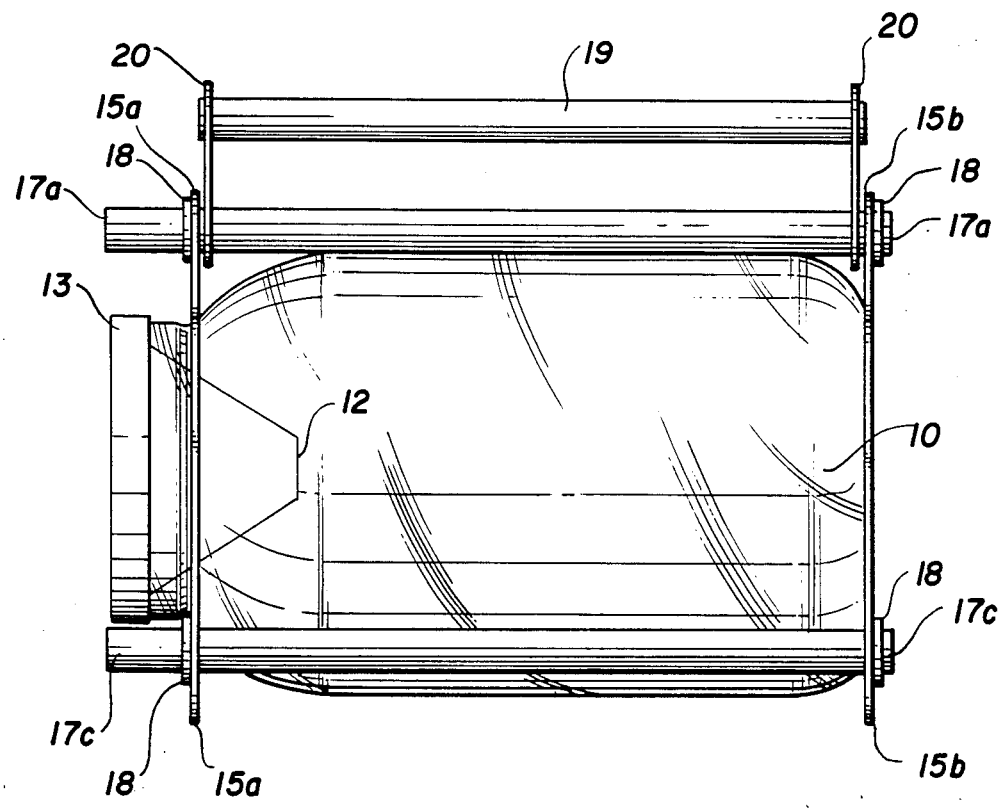
FIG. 1 is a side elevational view of the support stand of the present invention, supporting a minnow trap.
Figure 2:
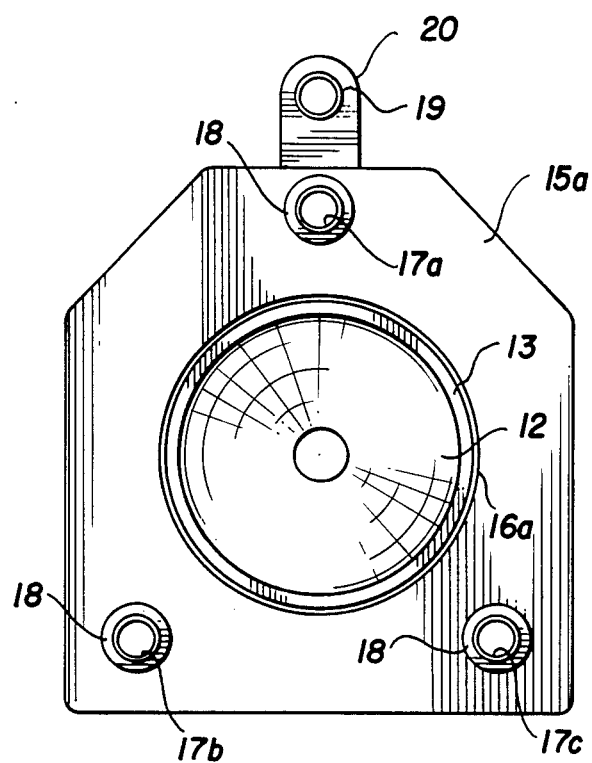
FIG. 2 is an end elevational view, taken along line 2—2 of FIG. 1.
Figure 3:
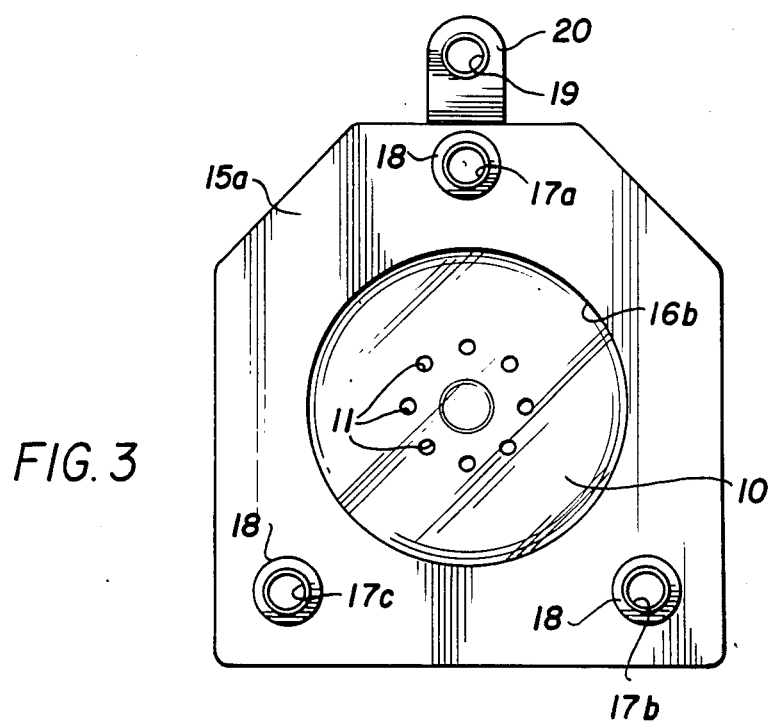
FIG. 3 is an opposite end elevational view, taken along line 3—3 of FIG. 1.

Referring to the figures, like numerals represent like elements throughout the several views.

With reference to the drawings the minnow trap comprises a jar or container 10 which includes holes 11 in the bottom of the jar 10. The mouth of the jar 10 has a funnel 12 secured therein by a cap ring 13. The funnel 12 includes an opening 14 in its center.

The jar 10 is preferably made of clear material such as ordinary glass or plastic. The funnel 12 may be fabricated from any suitable material such as plastic.

The support stand for the jar 10 is composed of two planar end plates 15a and 15b which are situated one at either end of the jar 10. The planar end plates 15a and 15b each have a circular aperture 16a, 16b. The bottom of the jar 10 is arranged, relative to plate 15b and its large opening 16b so that the openings 11 are not covered by the planer end plates 15b but show through the circular apertures 16b. At the top of the jar 10 the neck protrudes through the circular aperture 16a which is large enough to permit the neck of the jar 10 to pass through but is not large enough for the main body of the jar 10 to pass through.

The two planer end plates 15a and 15b are secured in place by three parallel cylindrical support rods 17a–17c. The parallel support rods 17a–17c are attached to the planer end plates by washers 18. Other means of attachment are also possible. Two of the support rods 17a, 17b are attached near the bottom of the planar end plates 15a, 15b separated by a distance which is sufficient to support the jar 10 thereon. The support rods 17a, 17b are preferably far enough apart that the jar 10 will hang down slightly below them as shown in FIG. 1. The upper support rod 17a is preferably attached to the end plates 15a, 15b such that it is centered over the jar 10. This support rod 17a is not in contact with the jar 10 in the rest position but it does serve to prevent the jar 10 from being removed from the support stand. The support rods 17a–17c are preferably hollow in order to offer less resistance to water currents by allowing the water to flow through them.

The preferred embodiment of the support stand also includes a hollow handle rod 19 which is attached to the top support rod 17a by a pair of handle links 20. The handle links 20 have circular holes therein which fit over the support rods 17a loosely enough to allow rotation of the hollow handle rod 19 about the support rod 17a.

The entire support stand is preferably constructed from a durable lightweight plastic.

In operation, the fisherman grasps the minnow trap by the hollow handle rod 19 and places it in a stream with the bottom of the jar 10 facing upstream and the top of the jar 10 facing downstream. Crackers or other suitable bait are placed inside the jar 10 prior to immersing it in the stream. Once the minnow trap is in the stream the jar 10 will fill with water and the current will pass through the openings 11 and carry the bait out through the hole 14 in the funnel 12. Minnows will be attracted by the bait and will swim into the trap through the hole 14 in the funnel 12 whereupon, after a suitable time, the fisherman grasps the trap by the handle rod 19 and removes it from the stream with the minnows trapped inside.

The handle rod 19 may also be used to secure the trap in a stream with a strong current simply by tying a rope to the handle rod 19 and securing the rope to an immovable object.

Although the invention is described in considerable detail with respect to a preferred embodiment thereof, it will be apparent that the invention is capable of numerous modifications and variations, apparent to those skilled in the art, without departing from the spirit or scope of the invention.

I claim:

1. A minnow trap for catching minnows in a moving stream of water, comprising:
    a jar having an enlarged main portion, a large opening at one end and small openings at the opposite end such that when the jar is arranged horizontally in a moving stream of water, the minnows can enter at the large end and water can pass through the openings at both ends,
    a support stand for said jar,
    said support stand having a pair of generally planar apertured, upright end plates, the aperture in one of said end plates receiving the end of the jar having the large opening and the other end plate engaging the said opposite end of the jar, exposing its said aperture to said small openings in said opposite end of the jar to permit water flowing through the small openings to pass therethrough,
    at least three generally parallel and generally horizontal support rods extending between the two end plates and attached thereto, said rods spacing the two end plates apart by a distance to receive said main portion of the jar, the support rods being spaced apart circumferentially around the jar to support said main portion of the jar so as to prevent the jar from moving laterally out from the space between the rods,
    the two end plates having lower portions which are lower than the level of the rods to form bottoms which rest on the ground surface,
    two of the support rods being lower support rods which form a lower support for the said main portion of the jar, and a third support rod located along the uppermost part of the main portion of the jar,
    and including a handle pivotally connected to the third support rod.

2. A minnow trap according to claim 1, the two end plates having generally straight bottom.

3. A minnow trap according to claim 1, wherein the support rods are hollow and opened at both ends, so as to permit the flow of water therethrough.

4. A minnow trap according to claim 1, wherein said handle is rotatable about the support rod to which it is attached.

* * * * *